US011836206B2

(12) United States Patent
Jiang

(10) Patent No.: US 11,836,206 B2
(45) Date of Patent: Dec. 5, 2023

(54) BARCODE SYSTEM WITH RE-PUBLISHABLE CONTENT OR TASKS

(71) Applicant: Jianfeng Jiang, Fremont, CA (US)

(72) Inventor: Jianfeng Jiang, Fremont, CA (US)

(*) Notice: Subject to any disclaimer, the term of this patent is extended or adjusted under 35 U.S.C. 154(b) by 505 days.

(21) Appl. No.: 17/028,622

(22) Filed: Sep. 22, 2020

(65) Prior Publication Data

US 2023/0109798 A1 Apr. 13, 2023

(51) Int. Cl.
*G06F 16/955* (2019.01)
*G06K 19/06* (2006.01)
*H04L 67/02* (2022.01)

(52) U.S. Cl.
CPC ... *G06F 16/9554* (2019.01); *G06K 19/06037* (2013.01); *H04L 67/02* (2013.01)

(58) Field of Classification Search
CPC .......... G06K 19/06037; G06F 16/9554; H04L 67/02
See application file for complete search history.

(56) References Cited

U.S. PATENT DOCUMENTS

| 2006/0147891 | A1* | 7/2006 | Dreyfous ................. G09B 7/00 434/362 |
| 2016/0255161 | A1* | 9/2016 | Lim ................... G06Q 30/0207 455/456.3 |
| 2017/0017869 | A1* | 1/2017 | Jiang ................... G06F 16/9554 |
| 2021/0247882 | A1* | 8/2021 | Norman ................ G06F 3/0484 |

* cited by examiner

*Primary Examiner* — Laura A Gudorf

(57) ABSTRACT

A Barcode System with Re-publishable Content or Tasks consists of a data server with User Data Management module and 2D Barcodes Management module, mobile communication devices with 2D barcode scanners, user ID recognition module and task reader, and 2D barcodes whose destination URLs are quizzes or games based on the users' skill levels. The Barcode gives certain users permission to select from the tasks received by scanning the barcode and republish them to other users' ebooks. There are also some settings in the barcode to control skill subscription, and valid dates etc. Once the user scanned the 2D barcodes, and finished the tasks, the results will be uploaded to the data server to re-evaluate the user's skill level and assign the next sets of tasks.

32 Claims, 15 Drawing Sheets

Task QR Code ID: 152

201 —————— Skill ID    Skill Name    Skill Owner

202    Monterey

202 —————— [Subscribe]

Select tasks to be published

| | Task ID | Task Name | Age min | Age max | Skill Level |
|---|---|---|---|---|---|
|  | 650 | https Say I Love You to your mom | 1 | 1 | Level 1 |
|  | 654 | monterey complete sentence https 0601 | 1 | 1 | Level 1 |
|  | 655 | Monterey Coloring | 1 | 1 | Level 1 |

203 points to the first row checkbox.

204 —————— [Publish]

301 — Select Task Ebook and Publish

| | Task Ebook ID | Task Ebook Name | Owner |
|---|---|---|---|
| ☐ | 11593 | My Tasks | Hg Ju |
| ☐ | 11547 | My Tasks | Lily P |
| ☐ | 11544 | My Tasks | Ben P |
| ☑ | 11541 | My Tasks | mark p |
| ☑ | 11092 | My Tasks | Jack P |
| ☐ | 11089 | My Tasks | Sarah P |
| ☐ | 11094 | US2028.2028.task | Beth P |
| ☐ | 11087 | My Tasks | Beth P |
| ☐ | 11606 | knowlebox2029.2029.task | Beth P |

☐ Select All

302 —— Select Publish Dates:

Start Date: 2020-08-13 12:54

End Date: 2020-09-13 12:54

[ Confirm ] [ Cancel ]

Fig. 3

Task QR Code ID: 147

201 —— Skill ID      Skill Name      Skill Owner

202        Monterey

Following tasks are published to task ebook: My Tasks

Valid dates: 09/13/2020 to 09/16/2020

| | Task ID | Task Name | Age min | Age max | Skill Level |
|---|---|---|---|---|---|
| 203 | 654 | monterey complete sentence https 0601 | 1 | 1 | Level 1 |
| | 657 | monterey decoder task | 1 | 1 | Level 1 |
| | 650 | https Say I Love You to your mom | 1 | 1 | Level 1 |
| | 656 | monterey task word search jj | 1 | 1 | Level 1 |

Fig. 4 re-directed URL in this patent is a combination of fixed URL and the ID of the user who scan the QRcode. So different users who scan the same QRcode will be re-drected to different personalized URLs re-directed URL in this patent is a combination of fixed URL and the ID of the user who scan the QRcode. So different users who scan the same QRcode will be re-drected to different personalized URLs

Add a New QR Code

Type: Task

Name: [          ]

Logo: [          ] [Add a Image]

1001 —— [Select Skill]

1002 —— Skill Subscribe: ● Yes ○ No

1003 —— Duplicate Tasks Publish Allowed: ● Yes ○ No

1004 —— Tasks ebook type: ● SystemMyTaskEbook ○ Other Task Ebook

1005 —— User Editable: ● Yes ○ No

Description: [          ]

1006 —— [Confirm]

Fig. 10

Add a New QR Code

Type: Task

Name:

Logo: [Add a Image]

502 — Skill ID: 155

Skill Name: test03072017

Skill Owner:

1001 — [Select Skill]

Tasks:

| Task ID |
|---|
| 1493 |
| 1494 |

503

[Select Task]

1002 — Skill Subscribe: ● Yes ○ No

1003 — Duplicate Tasks Publish Allowed: ● Yes ○ No

1004 — Tasks ebook type: ● SystemMyTaskEbook ○ Other Task Ebook

1005 — User Editable: ● Yes ○ No

Description:

1006 — [Confirm]

Fig. 13

Add a New QR Code

Type: Task

Name: [                    ]

502 —— Skill ID: 155

Skill Name: test03072017

Skill Owner:

1001 —— [Select Skill]

Tasks:

| Task ID |
|---|
| 1493 |
| 1494 |

503 ——

[Select Task]

1002 —— Skill Subscribe: ● Yes ○ No

1003 —— Duplicate Tasks Publish Allowed: ● Yes ○ No

1004 —— Tasks ebook type: ● SystemMyTaskEbook ○ Other Task Ebook

1401 —— User Editable: ○ Yes ● No

1402 —— Publish type: ● Start_End Dates ○ Number of Days

Start Date: 2020-01-12

End Date: 2019-10-20

1006  [Confirm]

Fig. 14

Add a New QR Code

Type: Task

Name:

502 —— Skill ID: 155

Skill Name: test03072017

Skill Owner:

1001 —— [Select Skill]

Tasks:

| Task ID |
|---|
| 1493 |
| 1494 |

503

[Select Task]

1002 —— Skill Subscribe: ● Yes ○ No

1003 —— Duplicate Tasks Publish Allowed: ● Yes ○ No

1004 —— Tasks ebook type: ● SystemMyTaskEbook ○ Other Task Ebook

1401 —— User Editable: ○ Yes ● No

1501 —— Publish type: ○ Start_End Dates ● Number of Days

1502 —— Number of days: [1 ▼]

[Confirm]

Fig. 15

BARCODE SYSTEM WITH RE-PUBLISHABLE CONTENT OR TASKS

FIELD OF INVENTION

This invention relates to 2 Dimensional Code, E-learning, E-commerce, Advertising, publishing, books, toys, internet of things, gaming, parenting and task & rewards system.

BACKGROUND OF THE INVENTION 2D barcodes are two dimensional codes comprising data, they can store website URL's, plain text, phone numbers, email addresses and pretty much any other alphanumeric data. They can be read using a 2D barcode scanner which are available on most of the mobile devices. There are several variations of the 2D barcodes, such as Quick Response Codes (QRC), and Microsoft Tag etc.

A 2D barcode can be static, of which the contents are fixed. It always points to the same web URL address or other fixed contents. A dynamic 2D barcode is the barcode that the web URL address it points to can be changed from a backend server. It consists of a fixed URL (usually short), which can then be re-directed to a new destination URL, and the new destination URL can be changed from the data server, so that effectively, a user who scan the 2D barcode can see content from different webpages from time to time.

2D barcodes are the best tool to bridge the physical world with the online world. With the popularity of smart phones which users can easily download 2D barcode scanners, the 2D barcodes have been widely adopted by advertisers, manufactures, retailers, and many businesses.

Our prior patent (U.S. Pat. No. 9,734,255 B2) makes a 2D barcode personalized so that each person who scan the same barcode will see different content!

On the other hand, people (especially kids) read lots of paper books, or play with toys or other physical things. But how can we know they really understand the content in the books or how the toy works? This means that we need an offline learning evaluation system so that we can know how well the user understand the books or toys or other physical things. This is also part of our prior invention: for each book, or toy, or other physical things, we make quizzes covering the topic, then we make 2D barcodes for these quizzes. User can scan these 2D barcodes and take the quizzes. The quizzes can be checked and the results can be sent back to the backend server for recording. For the quizzes, we can also let the user know the correct answers after they took the quizzes.

Our prior patent also includes a ladder system for each skill (for example, reading skill, math skill etc). The ladder system is to indicate the level of the skill, and the tasks that needed to advance to the next level. Each task can be a book reading, or a quiz, or a game, or other tasks to be assigned. The criteria of whether the user can be advanced to the next level is also defined as a separate module.

The grading of each task can be automatic or manual, or both. If it's automatic, then after the user finished the reading or finished the quiz, the results will be sent back to the server by the computer network without any human approval; if it's manual, then it needs to be approved by a judge (a teacher, for example) for the results to be used in determine the result of the task.

Each task will be linked with one 2D barcode, so that user can scan the barcode and do that task.

Our prior patent also claims that there is an account for each user, when a user scans the barcode, we will identify the user's ID using a user ID verification module, then we can direct the barcode's URL to an URL that's relevant to the user. For example, we may direct the user to a new book, or a new quiz or new task that's suitable for this user's skill level, rather than the prior art that all users are directed to the same web URL.

The mobile communication device can have a task reader (such as a E-book reader). After 2D barcode is scanned, the task content (quizzes, games etc) can be downloaded to the mobile communication device. This will make the contents be played with better qualities. After the task is done, the results will be uploaded to the data server.

The users can also download the task content to the mobile communication device directly from the data server without scanning any 2D barcodes. After the task is done, the results will be uploaded to the data server.

Our prior patent also claims that after the user scanned the barcode, did the quiz or passed the game, the results can also be used as instructions to control another device, such as open/close a lock; control a toy etc. The devices can be communicated through wireless protocol, or USB, or other device interfaces.

On the other hand, since each child's skill level is different. For the same book, toy etc, the prior mentioned barcode relies on the backend server to decide what's the appropriate content for the child. But sometimes a parent knows a child best, after a parent scans a Barcode, a set of e-content (ebooks, learning games, quizzes, or other tasks) will be retrieved, it would be desirable to give the parent the permission to select some content from the scanned list of content that suit for a child's skill level, and assign these content to that child. This is one aspect of this invention.

Furthermore, the e-learning content shown up after scanning the Barcode might be part of a bigger skill set, each set has several skill levels, each level has several tasks. It would also be desirable to check whether the parent subscribed to the whole skill set. If the parent didn't subscribe to the skill set, it would be desirable to give parent option to subscribe to the skill set, so that he/she can later select any other tasks from the skill set and assign them to his/her children. This is also part of this invention.

Some of the scanned content are tasks to be graded. The results will be uploaded. Ideally, the user (such as a parent or teacher) who republished the tasks after scanning a said Barcode should be the one that can check the task completion history. Therefore, it would be desirable, even though the initial creator of the Barcode is user A, if user B who scanned the Barcode has the permission to re-publish the content to his kids, the completion results by his kids will be viewable under user B. We may also make the completion results of the kids not viewable under user A account. This is also part of this invention.

Also, when a user scans a Barcode, the content will be published to a content folder (or an E-book without loss of generality). It would be desirable to set whether the content folder will be a particular e-book with a definite ebook id, or a general type of e-book. Eg. without loss of generality, we can define an e-book type: systemMyTask. Every user will have an e-book of the type systemMyTask, and this e-book name for every user is My Tasks. So, if we set the e-book type a Barcode content will be published to be systemMyTask, then after a user scans the Barcode, the content will be published to the My Tasks ebook of this user. This is also part of this invention.

Also, since a user can scan the same barcode multiple times during a certain period, it would be desirable to specify whether the scanned content will be published each time it's scanned. Or the scanned content can only publish once during a certain time period. This is part of the invention.

Furthermore, some learning materials, especially tasks, may have a valid time or date limit. The tasks will be invalid outside the specified valid time or date. The date can either be a fixed starting time/date & a fixed ending time/date, or a specified time period from the moment a user scans the barcode. This is also part of this invention.

It would also be desirable that when a certain user (such as the creator or owner of a barcode) scans the barcode, they can see the content of the barcode, and make changes to the content or other settings if necessary.

It is also desirable for some applications, such as a toy, once a child scans a barcode on the toy for the first time, a set of e-learning content or tasks will be published to this child's selected e-book. Once the child finished all or a required percentage of the tasks, the backend will automatically publish the next set of e-learning content or tasks to this e-book. The purpose of this is to let the child know some basic knowledge related to the toy first, then after the child played with the toys, will come back for more in-depth learning content or quizzes.

Another implementation is that after a child scans a barcode on the toy for the first time, a set of e-learning content or tasks will be published to this child's selected e-book. After the child finished all or a required percentage of the tasks, if he scans the Barcode again, a new set of e-learning content or tasks will be publish to this e-book or a new ebook. The purpose of this is to let the child know some basic knowledge related to the toy first, then after the child played with the toys, will come back for more in-depth learning content or quizzes. This implementation is covered by prior patent.

Without loss of generality, the said invention also applies to other type of barcodes or tags, such as a 3D Code (which may also be a 3D object), or a code using infrared scanning, Radio Frequency Scanning etc, so long as the code or tags can hold enough data to implement the said invention.

SUMMARY OF THE INVENTION

In accordance with one aspect of the invention, a Barcode is set not to be re-publishable, when a user scans the barcode, the associated content will be automatically published to a selected ebook or a selected type of ebook.

In accordance with one aspect of the invention, a Barcode is set to be re-publishable for certain users or certain types of users (such as Parent or Teacher). After scanning the Barcode, these users can select from the list of content, select other users' (such as a child's or a student's) content folders (such as ebooks), and re-publish the selected content.

In accordance with other aspect of the invention, after certain users of types of users scan a barcode, they are given the choice to subscribe to a larger content set or skill set.

In accordance with other aspect of the invention, if a user scans a barcode of another owner, and re-published some content to a new user's ebooks, the user can see the task completion history of the new user.

In accordance with other aspect of the invention, there is a type of ebook and every user has one or more ebooks of this type. When a user scans a bar code, the content will be automatically published to all the ebooks of this type.

In accordance with other aspect of the invention, there is a setting in a Barcode. If a user scans the same barcode multiple times during a certain period, this setting will determine whether the scanned content will be published each time it's scanned, or only be published once during a certain time period.

In accordance with other aspect of the invention, there is a setting in a Barcode. After a user scans the Barcode, this setting will determine whether the valid date/times of the published tasks have a fixed start date/time and a fixed end date/time, or a specified time duration from the moment a user scans the barcode.

In accordance with other aspect of the invention, when a certain user (such as the creator or owner of the barcode) scans a barcode, they can see the content of the barcode, and make changes to the content or other settings of the Barcode.

In accordance with other aspect of the invention, once a user scans a barcode for the first time, a set of content or tasks will be published to this user's selected e-book. Once the user finished all or part of the tasks, the backend will automatically publish the next set of e-learning content or tasks to this e-book.

Without loss of generality, the said inventions also apply to other types of barcodes or tags, such as 3D Code (which may be a 3D object), or a code using infrared scanning etc, so long as the code or tags can hold enough data to implement the said inventions.

BRIEF DESCRIPTION OF THE DRAWINGS

FIG. 3 shows the interface when a user with edit permission select ebooks and set publish dates, and then re-publish selected tasks.

FIG. 4 shows the interface when a user scans a non-editable barcode.

FIG. 10. Shows the interface when a user creates a new barcode.

FIG. 13 shows the interface after the user selected a skill & one or more tasks.

FIG. 14 shows the interface when the barcode is set to be not-editable, and has fixed start/end dates.

FIG. 15 shows the interface when the barcode is set to be not-editable, and set the start date to be the moment when a user scans the code, end date to be some days after the start date.

DETAILED DESCRIPTION OF THE INVENTION

The present invention relates to a Barcode System with Re-publishable Content or Tasks. The following description is presented to enable one of ordinary skill in the art to make and use the invention as provided in the context of a particular application and its requirements. Various modifications to the preferred embodiment will be apparent to those with skill in the art and the general principles defined herein may be applied to other embodiments. Therefore, the present invention is not intended to be limited to the particular embodiments shown and described, but is to be accorded the widest scope consistent with the principles and novel features herein disclosed.

Figure 1:
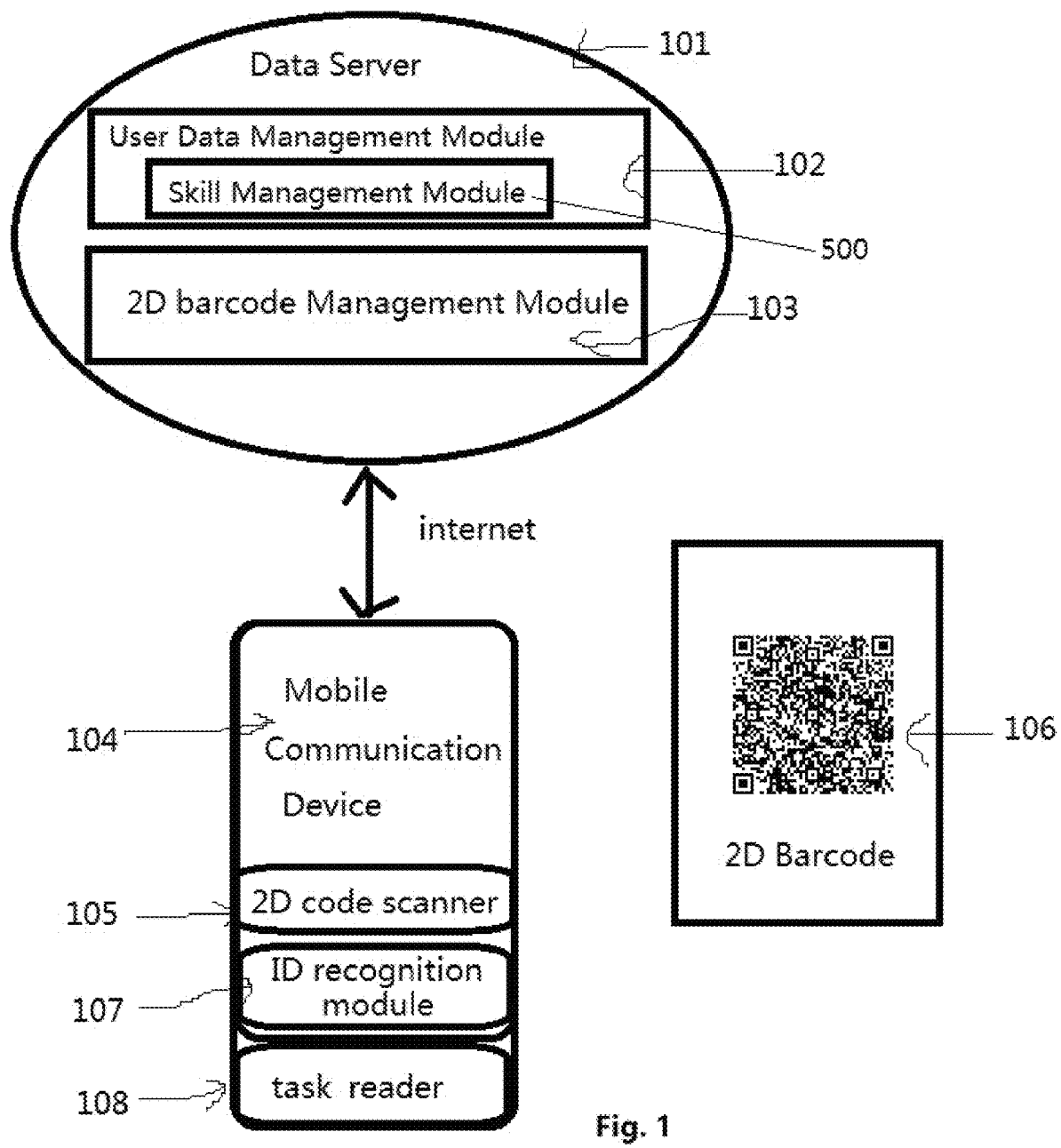
FIG. 1 is a schematic representation of the Barcode System with Re-Publishable Learning Content or Tasks, which consists of a data server with user data management module and 2D barcode management module, mobile communication devices with 2D barcode scanners, user ID recognition module and task reader, and 2D barcodes.

As shown in FIG. 1. the said invention of a Barcode System with Re-Publishable Content or Tasks consists of a data server 101 with User Data Management Module 102 and 2D Barcode Management Module 103, mobile communication devices 104 with 2D barcode scanners 105, user ID recognition module 107, task reader 108 and 2D barcodes 106 placed anywhere.

Figure 5:
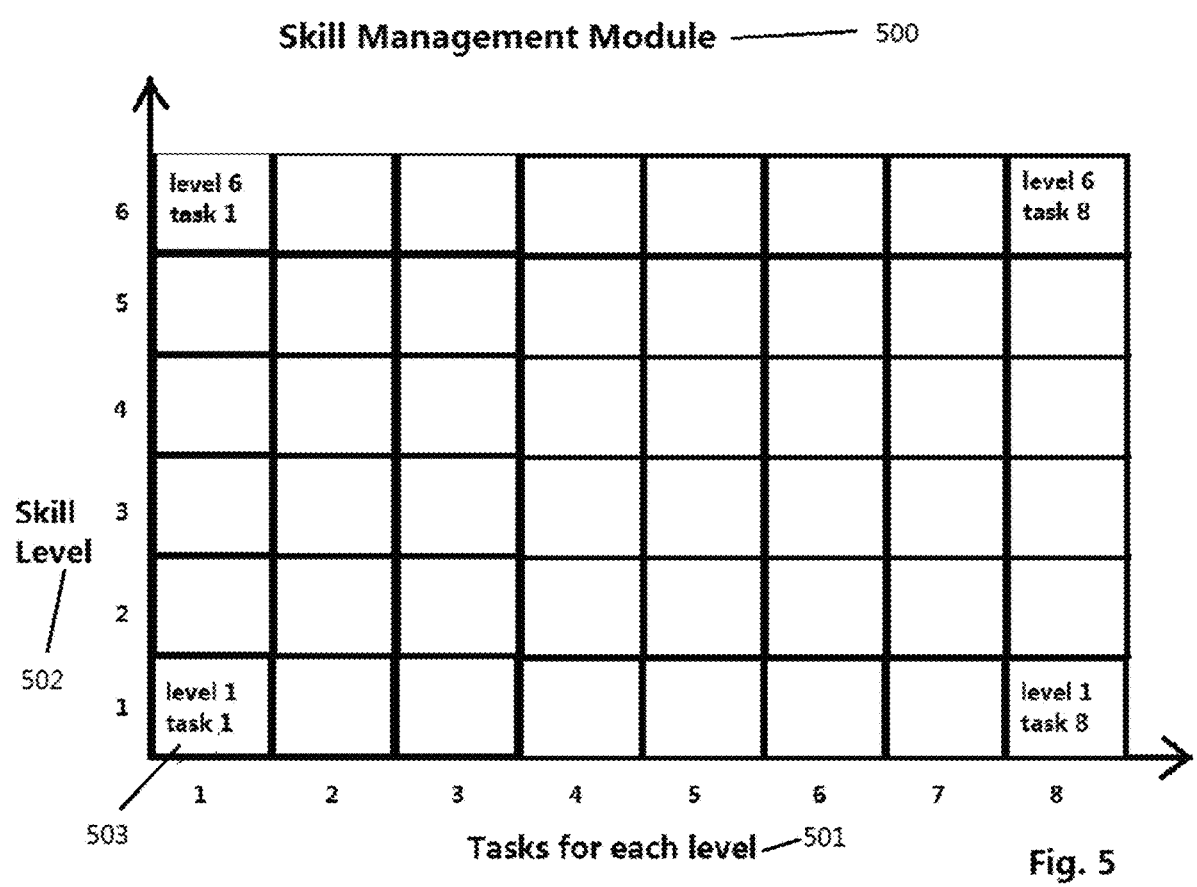
FIG. 5 Shows the skill management module in the user data management module, it lists all the skills, the levels for each skill, the tasks (quizzes, games or other tasks) needed for each skill level. The method to determine the quality of the tasks. And the criteria to determine how a user can advance to the next skill level, and the actual completion history of each task.

FIG. 1 & FIG. 5 show that the user data in the User Data Management Module 102 includes not only the user name, sex, contact info, social title or social role (such as parent, teacher, doctor. etc), but also a Skill Management Module 500, which lists the skills, and the levels for each skill 502, the tasks 503 (quizzes, games, or other tasks) needed for each skill level 502, also the method to determine whether the tasks are passed, and the criteria to determine how a user can advance to the next skill level, and the actual completion history of each task.

Each 2D barcode 106 is linked with one or more tasks 503, which can be put on websites, paper books, toys, or any other places, so that the users can do the tasks anytime and anywhere.

Figure 6:
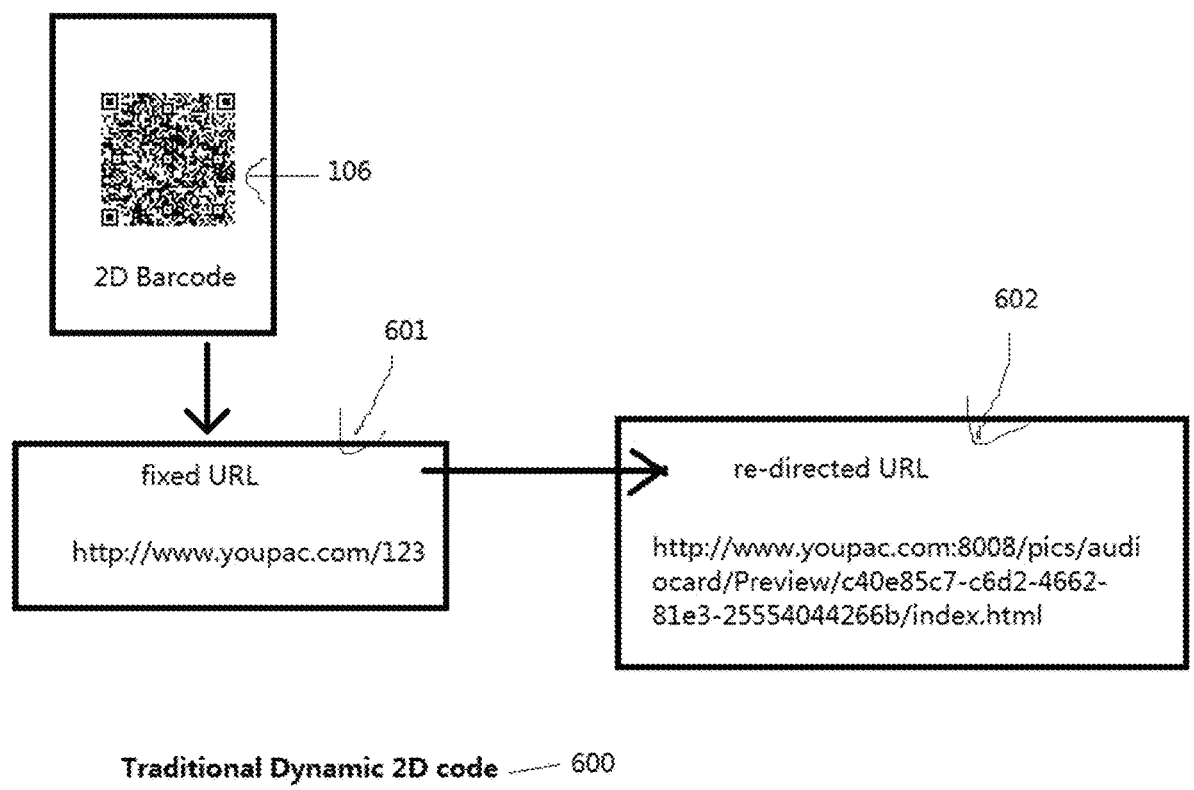
FIG. 6 shows the mechanism of a traditional dynamic 2D barcode: A dynamic 2D barcode is the barcode that the destination URL address it points to can be changed by the 2D barcode management module. It consists of a fixed URL, which can then be re-directed to another URL, and the new URL can be changed. So effectively, a user who scan the 2D barcode can see contents from different websites. But all users who scan the 2D barcode will see the same contents.

FIG. 6 shows a traditional dynamic 2D code. It consists of a fixed URL 601 (usually short), which can then be redirected to a new destination URL 602, and the new destination URL 602 can be changed from the data server, so that effectively, a user who scan the 2D barcode 106 can see contents from different webpages from time to time. But all the users who scanned the same 2D code 106 will see the same contents.

Figure 7:
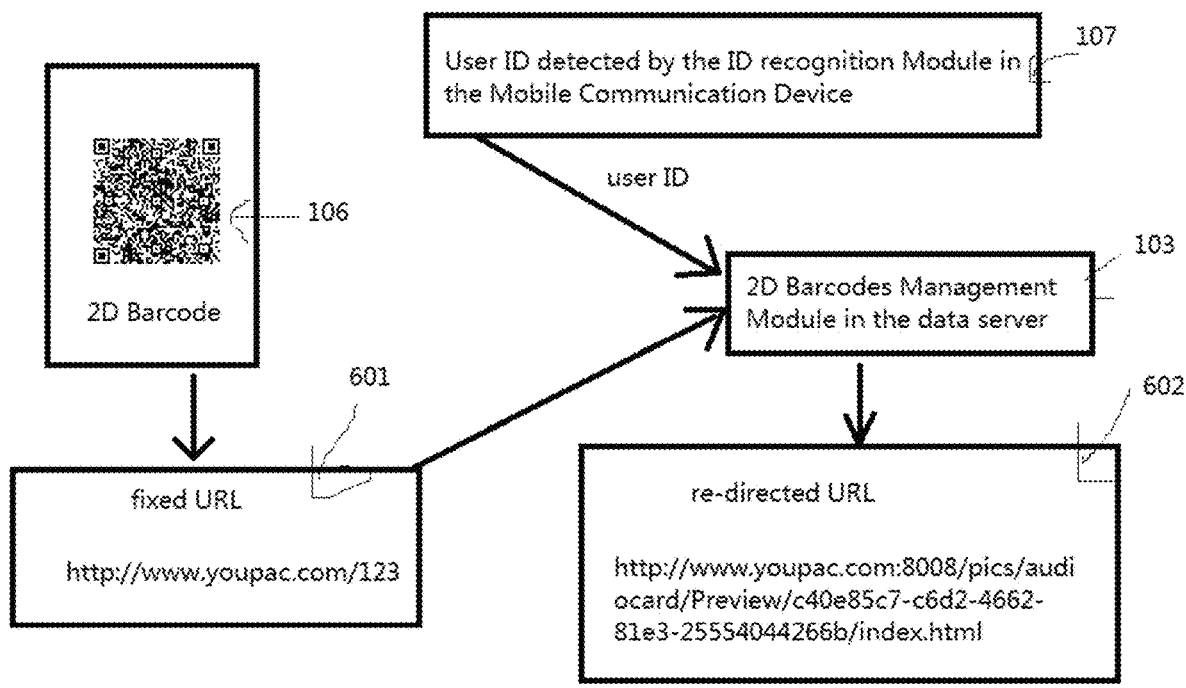
FIG. 7 shows one method to enable different users who scan the same 2D barcode see different contents. Our program on the mobile communication device has an ID recognition module, which can identify the user before or after he scanned the 2D barcode. These information is uploaded to the backend 2D barcode management module to determine what should be the proper contents for this user.

As shown in FIG. 7. the user ID recognition module 107 in the mobile device may identify the user by account login, phone number, email address, facial, thumb image, voice, retinal scan or other biometric technology. The user ID recognition module 107 can identify the user before or after he scanned the 2D code, FIG. 8 shows that the fixed URL of the 2D code may contain a web page 603 for the user to login, which is another way to identify the user.

Figure 8:
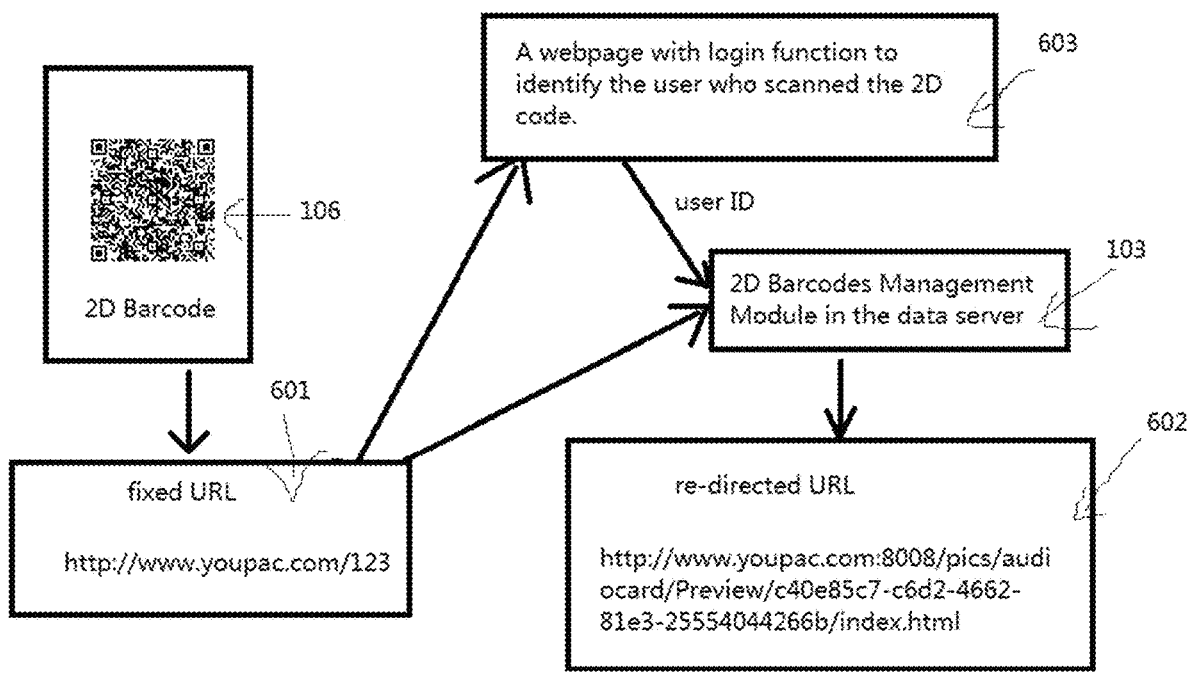
FIG. 8. shows another method to enable different users who scan the same 2D barcode see different contents. The fixed URL for the 2D barcode leads to a login page, so that after login, the user ID is uploaded to the backend 2D barcode management module to determine what should be the proper contents for this user.

FIG. 7 and FIG. 8 shows that after the user scanned the 2D code 106 and his identity is identified by either the ID recognition module 107 or by the webpage with login 603, the backend 2D Barcode Management Module 103 can direct the user to a personalized link determined by this 2D code and the identity of the user. So that different user can see different contents, even though they scanned the same 2D code.

Also after the user scanned the 2D code 106, and finished the task 503 linked to the 2D code, the completion results of the task will be uploaded to the Skill Management Module 500.

The grading of each task 503 can be automatic or manual, or both. If it's automatic, then after the user finished the task 503, the results will be sent back to the Skill Management Module 500 by the computer network without any human approval; if it's manual, then it needs to be approved by a judge (a teacher, for example) for the results to be used in determine the result of the task.

The Skill Management Module 500 can determine the user's skill level based on tasks 503 completed, and deliver proper contents to each 2D barcode, so that when a user scan the barcode 106, he can be assigned the tasks that's tailored to his skill level 502.

FIG. 1 shows that the mobile communication device 104 can have a task reader 108 (such as a E-book reader). After 2D barcode 106 is scanned, the url 601 or 602 linked with the 2D barcode 106 will return data to the task reader 108. The data can be in webpage, xml, json or other data formats. The task reader 108 can then retrieve task content (quizzes, tests, homework assignments, games, reading assignments, sports activities, acting, singing, or physical activities) by directly open the webpage, or download them to the mobile communication device 104 which will make the content be played with better qualities. After the task is done, the results will be uploaded to the Skill Management Module 500.

Another aspect to mention is that after 2D barcode 106 is scanned, the content or tasks can be pure audio instructions, the user can reply or upload results directly via audio. Of course, this means that the communication device 104 and backend server 101 have the voice recognition module.

The users can also download the task 503 content to the mobile communication device directly from the data server without scanning any 2D barcodes. After the task is done, the results will be uploaded to the Skill Management Module 500.

Figure 9:
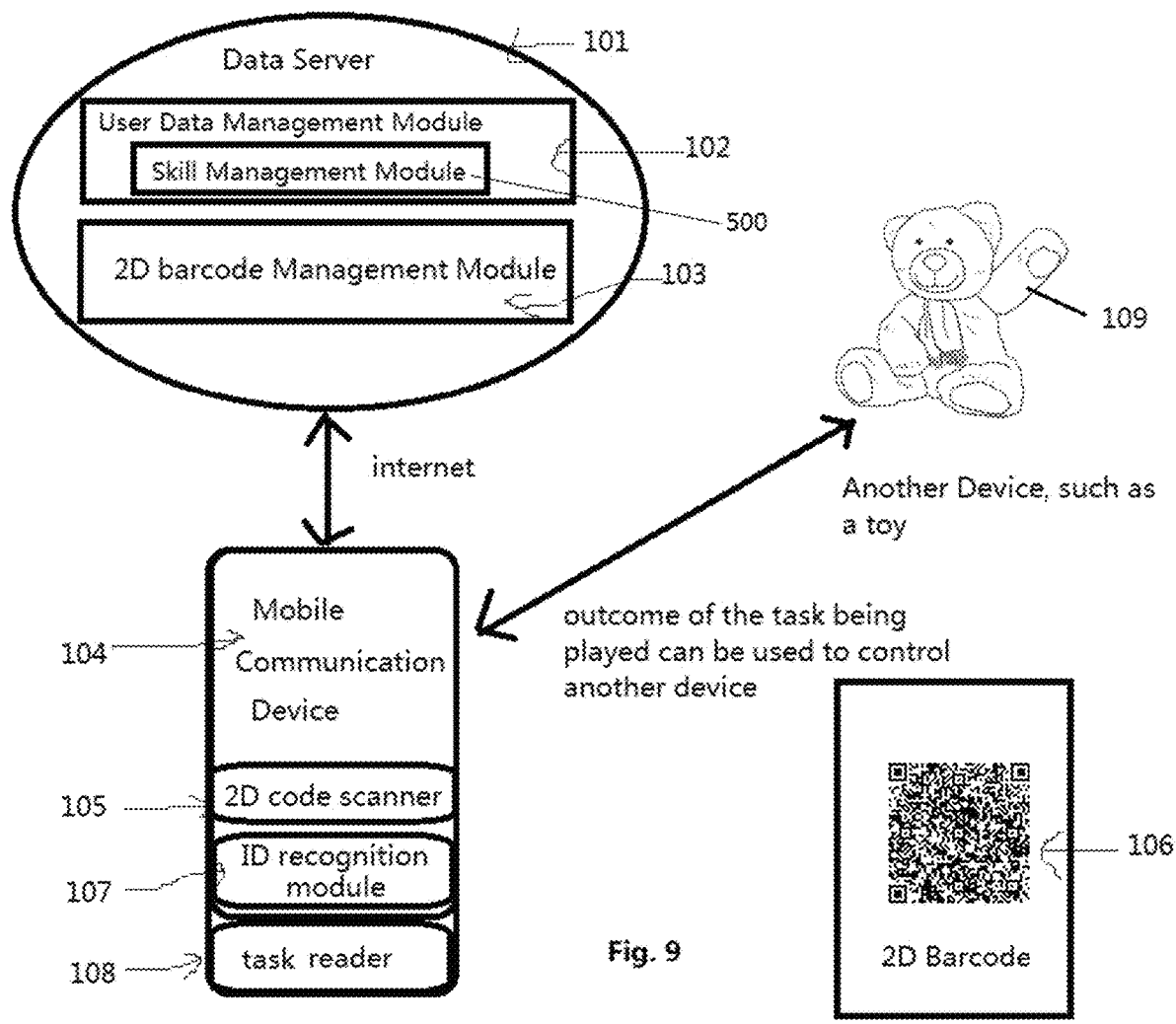
FIG. 9. shows that the outcome of tasks completion can be used to control other devices.
Figure 11:
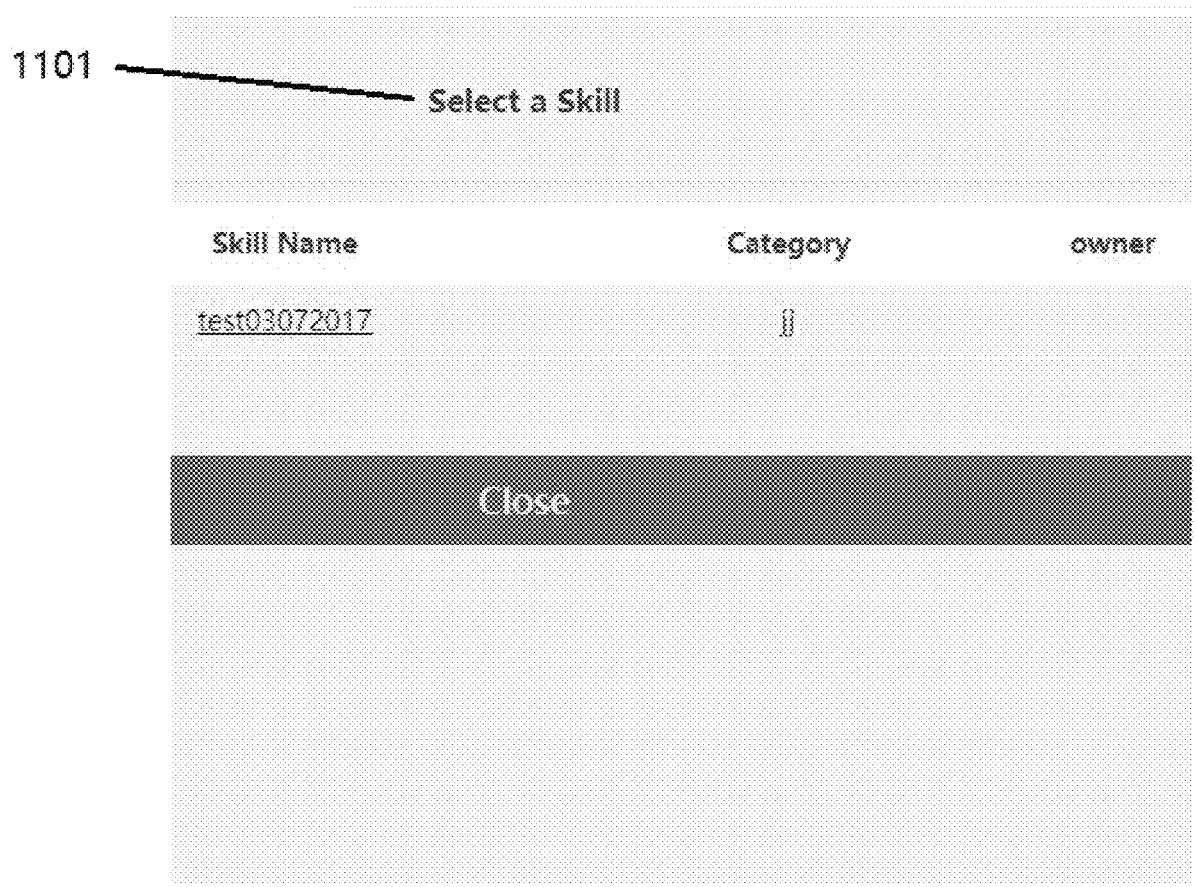
FIG. 11. Shows the interface when a user selects a skill.
Figure 12:
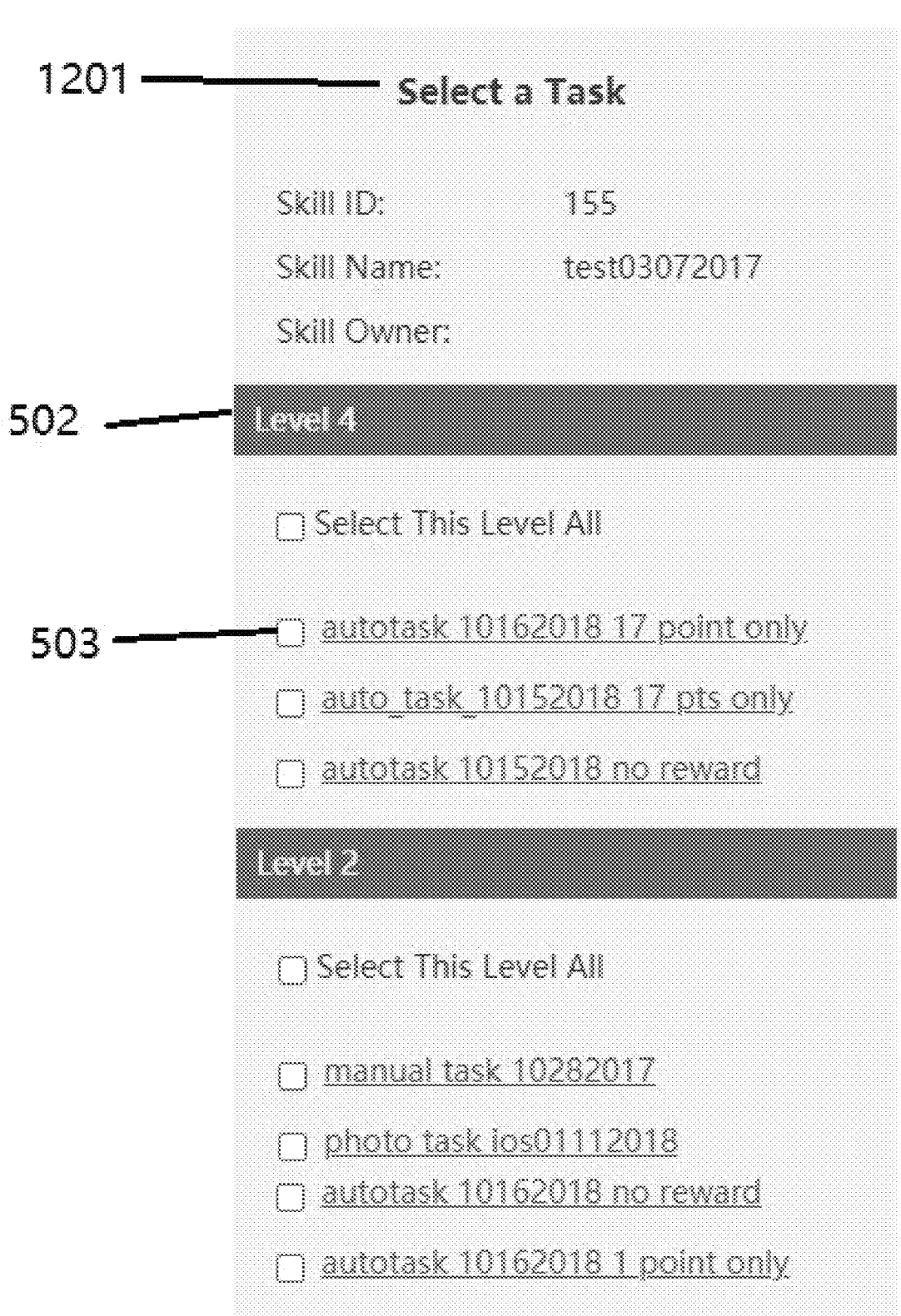
FIG. 12 shows the interface when a user selects one or more tasks from different task levels.

FIG. 9. shows that after the user scanned the 2D barcode 106, opened the tasks 503 linked with it. The outcome of the tasks 503 can be used to control other devices 109 through wireless communication protocols (such as WiFi, 3G/4G, bluetooth), USB or other device communication interfaces. For example, the 2D barcode 106 may be linked to one or more tasks 503 including game or quiz, the user can then control another device 109's functions (such as power up/power down, voice, sound, motion, lighting, odor, pressure, temperature, humidity, parental control or other applications & functions) using the results of the games or quizzes. Of course additional devices needed to be installed in the device 109 to communicate with the mobile communication device 104 and to control the device 109.

In the meantime, the results of the games or quizzes can be used to control the mobile communication device 104's own functions, such as power up/power down, voice, sound, motion, lighting, odor, pressure, temperature, humidity, parental control or other applications & functions.

FIG. 10-15 show how the Data Server 101 makes a said barcode:

1. Select a skill (1001 & 1101)
2. Select one or more tasks from the skill (1201)
3. Set whether certain users (such as parents or teachers) can subscribe to the skill. (1002)
4. Set whether during the set valid dates, if a user scans the same barcode multiple times, will the tasks be republished each time, or be published only once. (1003)
5. Set which type of Ebooks will the task be published to after a user scan the barcode. (1004)
6. Set whether certain users (such as parents or teachers) can republish the tasks to other users (such as a child or a student). If user editable=yes. Then certain users can republish the tasks. (1005)
7. If the barcode is not editable, then set whether the valid date will be a fixed start date and a fixed end date (1401, 1402). Or the start date will be the date when a user scans this barcode, and the end data will be pre-set number of days (or minutes, hours) after the start date (1501, 1502). Or the start date will be the date when a user scans this barcode, and the end data will be a fixed date.

FIG. 4 shows that for a not editable barcode, when a user scans it, all the tasks linked with the barcode will be automatically published to the specified ebook owned by the user. Different users scan the same barcode, can get different content as covered in prior patent.

Figure 2:
FIG. 2 shows the interface when a user with edit permission scans an editable barcode and select tasks.
Figure 2:
Figure 2:

FIG. 2-3 shows that for an editable barcode, if certain users or types of users (such as a parent) scan the barcode, he can select some tasks from the task list (203) and select one or more ebooks belonging to his kids (301), and select the valid dates for the tasks (302).

On the other hand, other users (such as kids) scan the editable barcode, there will not be any tasks automatically published to their ebooks, since they rely on parents to scan the barcode and select tasks and publish these tasks to kids' ebooks. In this implementation, after the second user scans the barcode, he will receive a text message indicating that he is not able to receive any tasks directly by scanning the barcode.

Another method of implementation for an editable barcode is that after a parent user selected the tasks (203), the selected tasks will be published to a group linked with the barcode. After that if a child scans this barcode, the tasks in this group will be automatically published to the child's designated ebooks (301).

In the meantime, for an editable barcode, if the skill is subscribable, once a certain user (such as a parent) scans the barcode, the data server 101 will check whether the user has already subscribed to this skill. If not, a subscribe button 202 will be shown to let the user subscribe to the skill 201, so that he can select any other tasks (not just those shown in this barcode), and publish them to his kids.

Moreover, if the skill is subscribable, after certain user (such as a parent) scan the barcode, and republish some tasks to her child, the task completion history should be accessible by the parent, and may be not accessible by the original barcode owner for protection of privacy.

The content associated with the barcode can be fixed content, or dynamic content that will be different every time it's being scanned.

If the owner of the barcode (or other pre-set users) scan the barcode, they will be able to see the tasks linked with the barcode, and make changes to the task list, as well as other barcode settings. This makes it possible for the owner to verify content of the barcode and make changes if necessary.

The task barcode can be printed on a piece of paper or a flashcard, the actual content can also be printed on the paper or the flashcard so that the parent can know exactly what content is associated with this Barcode, then decide whether or not to scan the barcode, and select some tasks for his kids.

For some applications, such as a toy, once a child scans a barcode on the toy for the first time, a set of e-learning content or tasks will be published to this child's selected e-book. Once the child finished all or part of the tasks, the data server 101 will automatically publish the next set of e-learning content or tasks to this e-book. The purpose of this is to let the child know some basic knowledge related to the toy first, then after the child played with the toys, will come back for more in-depth learning content or quizzes.

The invention claimed is:

1. A computer-implemented method comprising:
   receiving, from a first client device, a first request comprising a first user identifier, wherein the first request is generated by the first client device based on scanning a barcode, the barcode encoding a set of alphanumeric characters;
   generating, based on the first request and the first user identifier, a first response;
   transmitting, to the first client device, the first response;
   based on settings of the barcode, selecting some content from the first response, and assigning the selected content to a second user;
   receiving, from a second client device, a second request comprising a second user identifier, wherein the second request is generated by the second client device based on scanning the barcode;
   generating, based on the second request and the second user identifier, a second response; and
   transmitting, to the second client device, the second response.

2. The method of claim 1, wherein the barcode is two dimensional or 3 dimensional.

3. The method of claim 1, wherein the barcode is human visible, or infra-red, or Radio-frequency.

4. The method of claim 1, wherein the first response comprises a first uniform resource locator (URL) and the second response comprises a second URL.

5. The method of claim 1, wherein the first response comprises a first uniform resource locator (URL) and the second response comprises a text message.

6. The method of claim 1, wherein:
   the receiving the first request comprising the first user identifier comprises receiving a first Hypertext Transfer Protocol (HTTP) request generated by the first client device upon scanning the barcode, and
   the receiving the second request comprising the second user identifier comprises receiving a second Hypertext Transfer Protocol (HTTP) request generated by the second client device upon scanning the barcode.

7. The method of claim 1, further comprising:
   determining, based on the first user identifier, a first profile information associated with a first user, wherein the generating the first response is based on the first profile information; and determining, based on the second user identifier, a second profile information associated with a second user, wherein the generating the second response is based on the second profile information.

8. The method of claim 7, wherein the first profile information comprises a first skill level associated with the first user and the second profile information comprises a second skill level associated with the second user.

9. The method of claim 8, wherein the first skill level associated with the first user may be determined by a first age or social role of the first user, and the second skill level associated with the second user may be determined by a second age or social role of the second user.

10. The method of claim 1, wherein under one setting of the barcode, the first response provides access to one or more first tasks, and the second response provides access to one or more second tasks.

11. The method of claim 1, wherein the setting of the barcode determines whether the first user can subscribe to one or more skill library.

12. The method of claim 1, wherein the setting of the barcode determines whether the content will be assigned each time a user scans the barcode, or will be assigned only once during a valid time period.

13. The method of claim 1, wherein the setting of the barcode determines whether valid dates/time of the content are a fixed start date/time and a fixed end date/time; or the start date/time is the date/time when a user scans the barcode, and the end date/time will be a pre-set number of days or a pre-set length of time after the initial scanning.

14. The method of claim 1, wherein the first response allows the first user to make changes to the content and the settings of the barcode, if the first user is identified to be an owner of the barcode, or a user with permission to edit the barcode.

15. The method of claim 1, wherein the content in the first response is one or more tasks from a skill library, the skill library has one or more skill levels, and each level has one or more tasks.

16. The method of claim 1, wherein the first user can select some content in the first response and publish the selected content into one or more content folders of the second user, if the first user is identified to have permission to do so.

17. The method of claim 1, wherein the content selected by the first user from the first response are set to be the new content of the barcode, and the selected content will be in the second response of the second user after the second user scans the barcode.

18. The method of claim 1, wherein the content of the first response is displayed together with the barcode on a printed paper or an electronic display.

19. The method of claim 1, further comprising:
receiving, from the first client device, one or more first results associated with the one or more first tasks;
storing first results information associated with the first user profile;
receiving, from the second client device, one or more second results associated with the one or more second tasks; and
storing second results information associated with the second user profile.

20. The method of claim 19, wherein:
the one or more first tasks comprise one or more first quizzes, tests, homework assignments, games, reading assignments, sports activities, acting, singing, or physical activities,
the first results information comprises one or more first answers, scores, performance metrics, or evaluation metrics received from the first client device,
the one or more second tasks comprise one or more second quizzes, tests, homework assignments, games, reading assignments, sports activities, acting, singing, or physical activities,
the second results information comprises one or more second answers, scores, performance metrics, or evaluation metrics.

21. The method of claim 19, wherein the first user has access to the second results if the first user re-assigns the content to the second user.

22. The method of claim 1, wherein the first user identifier is input into the first client device in response to a prompt generated upon scanning the barcode.

23. The method of claim 1, wherein the first user identifier is input into the first client device by account login, phone number, email address, facial recognition, thumb-image recognition, voice recognition, retinal scanning or other biometric technology.

24. The method of claim 1, wherein the second response instructs the second client device to activate a functionality of an electronic device.

25. The method of claim 24, wherein the electronic device comprises another device or the second client device, and wherein the functionality allows the second client device to control the electronic device's functions including at least one of power up/power down, voice, sound, motion, lighting, odor, temperature, humidity, pressure, parental control, and other applications on the electronics device.

26. The method of claim 1, wherein the second user will automatically receive a new set of content if the second user finished all or a required percentage of prior published set of content.

27. The method of claim 10, wherein the one or more first tasks and second tasks are audio instructions.

28. The method of claim 19, wherein the one or more first results and second results are audio responses.

29. A system comprising:
a memory;
at least one processor coupled to the memory and configured to:
receive, from a first client device, a first request comprising a first user identifier, wherein the first request is generated by the first client device based on scanning a two-dimensional barcode, the barcode encoding a set of alphanumeric characters;
generate, based on the first request and the first user identifier, a first response;
transmit, to the first client device, the first response;
based on settings of the barcode, select some content from the first response, and assign the selected content to a second user;
receive, from a second client device, a second request comprising a second user identifier, wherein the second request is generated by the second client device based on scanning the two-dimensional barcode;
generate, based on the second request and the second user identifier, a second response; and
transmit, to the second client device, the second response.

30. The method of system of claim 29, wherein the first response comprises a first uniform resource locator (URL) and the second response comprises a second URL.

31. The system of claim 29, wherein:
- the first request comprises a first Hypertext Transfer Protocol (HTTP) request generated by the first client device upon scanning the barcode, and
- the second request comprises a second Hypertext Transfer Protocol (HTTP) request generated by the second client device upon scanning the barcode.

32. The method of claim 16, wherein the one or more content folders are identified by folder types.

* * * * *